Nov. 20, 1962 C. O. SHRUM 3,064,943
PNEUMATIC OPERATOR FOR TRAILER LANDING GEAR
Filed May 8, 1959 3 Sheets-Sheet 1
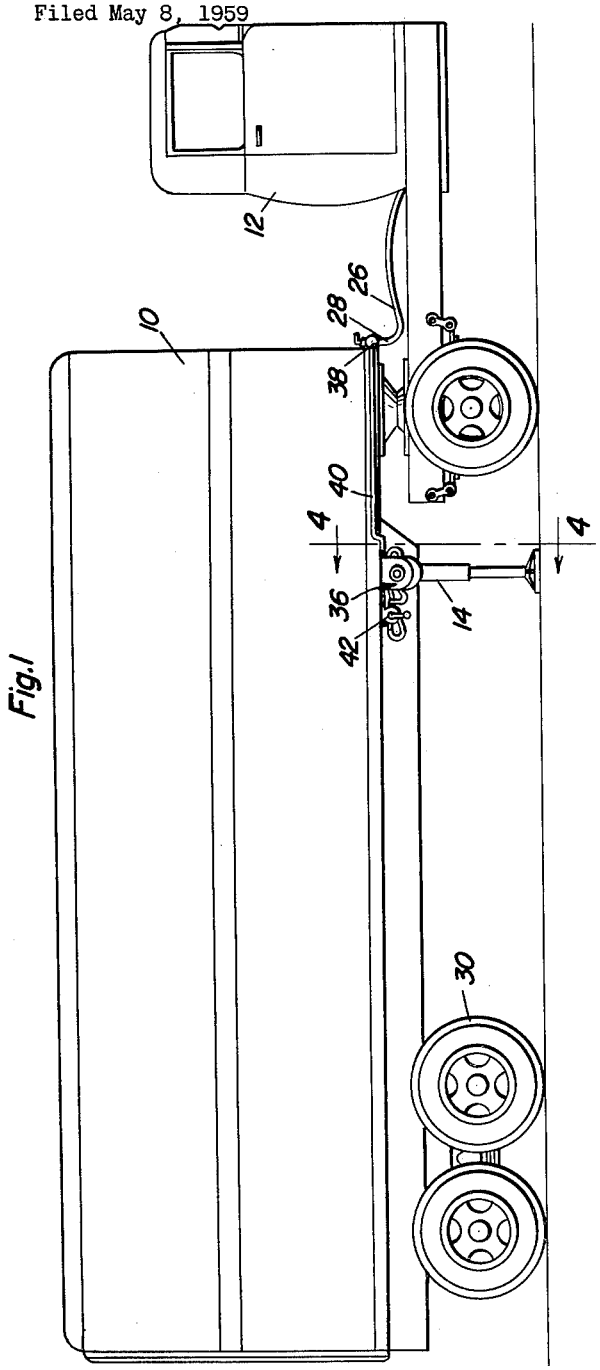
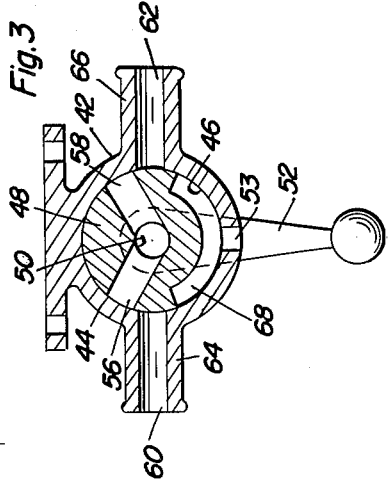
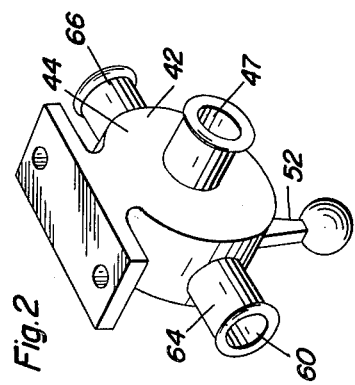
Calvin O. Shrum
INVENTOR.

Nov. 20, 1962 C. O. SHRUM 3,064,943
PNEUMATIC OPERATOR FOR TRAILER LANDING GEAR
Filed May 8, 1959 3 Sheets-Sheet 2

Calvin O. Shrum
INVENTOR.

BY *Clarence A. O'Brien*
*and Harvey B. Jacobson*
Attorneys

Nov. 20, 1962  C. O. SHRUM  3,064,943
PNEUMATIC OPERATOR FOR TRAILER LANDING GEAR
Filed May 8, 1959  3 Sheets-Sheet 3
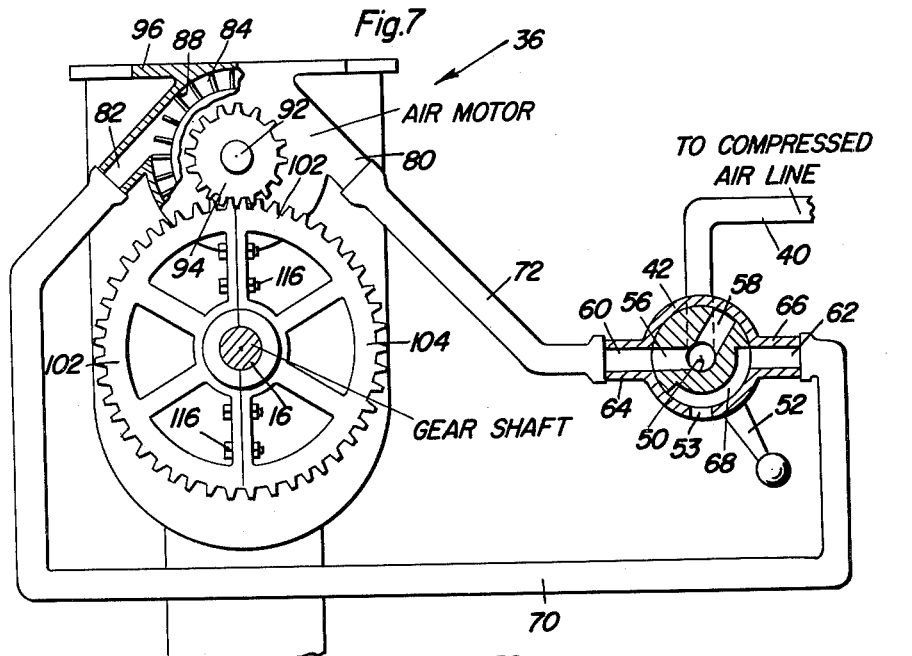
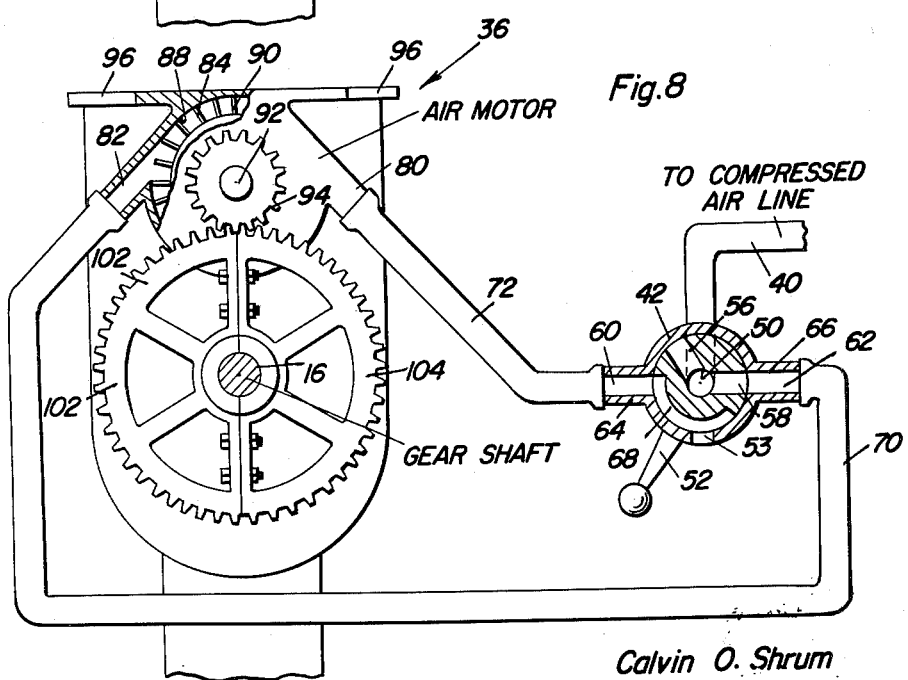
Calvin O. Shrum
INVENTOR.

United States Patent Office 3,064,943
Patented Nov. 20, 1962

3,064,943
PNEUMATIC OPERATOR FOR TRAILER
LANDING GEAR
Calvin O. Shrum, Stockton, Calif.
(P.O. Box 4237, Colorado Springs, Colo.)
Filed May 8, 1959, Ser. No. 811,822
1 Claim. (Cl. 254—86)

This invention relates to landing gear equipment for trailers and more particularly to a pneumatic operator for the conventional landing gear of trailers.

An object of the invention is to provide a pneumatic operator of very simple construction which is easily installed as original equipment or as a conversion kit to change from the manual or other type of operator of trailers to a pneumatic system.

It is pointed out at the outset that the pneumatic operator may be used as original equipment. Further, the pneumatic operator is so designed that it may be made up as a kit for the truckers to install themselves or have installed without in any way altering the construction of the conventional landing gear operator that is already a part of the trailer.

A pneumatic operator in accordance with this invention includes only a few principal components. A gear adapter is easily attached to the existing landing gear shaft, and a simple air motor is attached on a suitable part of the trailer. The air motor drives a gear which is in engagement with the adapter gear, and it is preferred that the air motor obtain air under pressure from the ordinary supply thereof, this also being a conventional part of the equipment of a tractor-trailer combination. For example, the available source of air under pressure may be taken from the brake line which connects to the rear wheels of the trailer. In such an installation, a three-position valve is suggested whereby the air motor is capable of being operated in a clockwise, or counter-clockwise direction or the valve may be set in an off position.

As is well-known to those versed in the trucking industry there is a considerable amount of time expended in operating the landing gears of the trailer in a fleet. This time may be materially reduced, to say nothing of the effort that is avoided by using a pneumatic operator such as disclosed herein. The savings in time and effort alone are considered to be justification for the small additional equipment which the pneumatic operator requires. This is especially true when considering the fact that landing gears are already available on trailers and no part of the conventional landing gear is disturbed by the installation of the pneumatic operator. Furthermore, even the manual means, usually a crank, for operating the conventional landing gear is left unaltered so that even with the installation of the pneumatic operator, the landing gear may still be manually operated as an emergency measure.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a conventional tractor and trailer equipped with a pneumatic operator in accordance with the invention.

FIGURE 2 is a perspective view of a valve constituting a part of the pneumatic operator.

FIGURE 3 is a longitudinal sectional view of the valve in FIGURE 2 showing it in the off position.

FIGURE 7 is a diagrammatic view showing the arrangement of parts when the air motor is operatively connected with the gear shaft of the manual operator.

FIGURE 8 is a diagrammatic view similar to that of FIGURE 7 but showing the valve in a different position from that in FIGURE 7.

Figure 5:
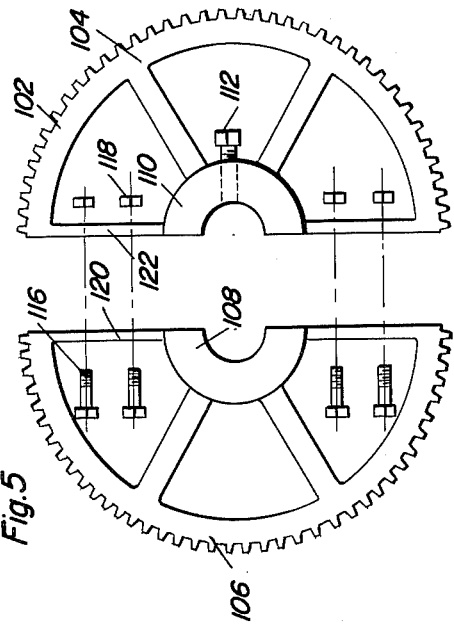
FIGURE 5 is an exploded elevational view of an adapter gear constituting a part of the operator.

In the accompanying drawings there is a conventional trailer 10 which is adapted to be drawn by a conventional tractor 12. The tractor-trailer assembly is absolutely conventional, and this view is interpreted to be diagrammatically representing any type and manufacturer's make of tractor and trailer equipped with a landing gear 14 which is also conventional equipment. The landing gear is attached to the trailer 10 and is known in the art; the ordinary way that the landing gear operates is to rotate gear shaft 16 by crank 18 connected to the outer end of the gear shaft near a bearing 20 for the gear shaft. Rotation of shaft 16 causes extension or retraction of the landing gear jack 22.

In addition to the standard equipment of the tractor and trailer mentioned above, all tractors and trailers of today are equipped with air brakes and an air brake system 26. A brake line 28 which extends from a pneumatic system on the tractor 12 has a coupling which connects to brake lines that extend to the rear wheels 30 of the trailer 10. Even though it is possible to use other sources of air under pressure, the pneumatic operator 36 is preferably connected with the air line 28 at valve 38 in order to have available at all times a source of air under pressure. Line 40 extending from valve 38 may be made of any material, for instance, it may be a flexible hose or a rigid hose or tubing. Line 40 extends to valve 42, this being a three-way valve.

Valve 42 is bolted or otherwise secured in a convenient place to the trailer 10, for instance to the bottom thereof (FIGURE 1) and has a valve body 44 made with a cylindrical bore 46 functioning as a valve chamber. The valve body or case 44 has a compressed air inlet 47 (as seen in FIGURE 2) established by a nipple, integral with, threaded or otherwise connected to the valve body, and to which line 40 is suitably secured. As seen in FIGURE 3, the valve core 48 has a central passage 50 on the axis of rotation of the core, and there is a valve operating lever 52 attached to the valve core and disposed on the exterior of the body 44 for manual operation. Central passage 50 has radial branch passages 56 and 58 registered therewith and opening through the cylindrical outer surface of the valve core. These radial passages are adapted to align with the passageways 60 and 62 formed by nipples 64 and 66 cast integral or otherwise secured to the valve body 44. An exhaust groove 68 is in the surface of valve core 48 and is arcuate in cross-section (FIGURE 3).

Air conductors or lines 70 and 72 are attached at their ends to nipples 66 and 64 (FIGURES 7 and 8) and to the combination inlet and outlets 80 and 82 of air motor 84.

Figure 6:
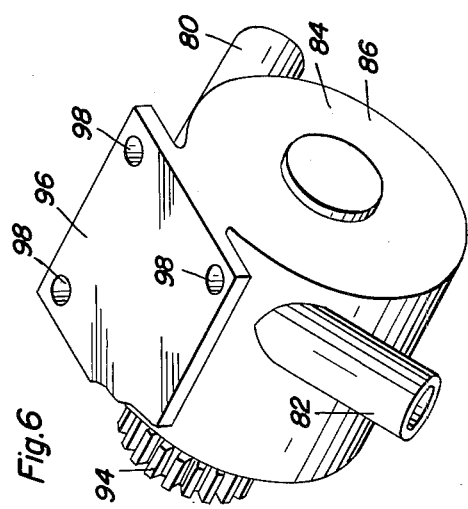
FIGURE 6 is a perspective view of the air motor which also constitutes part of the pneumatic operator.
Figure 4:
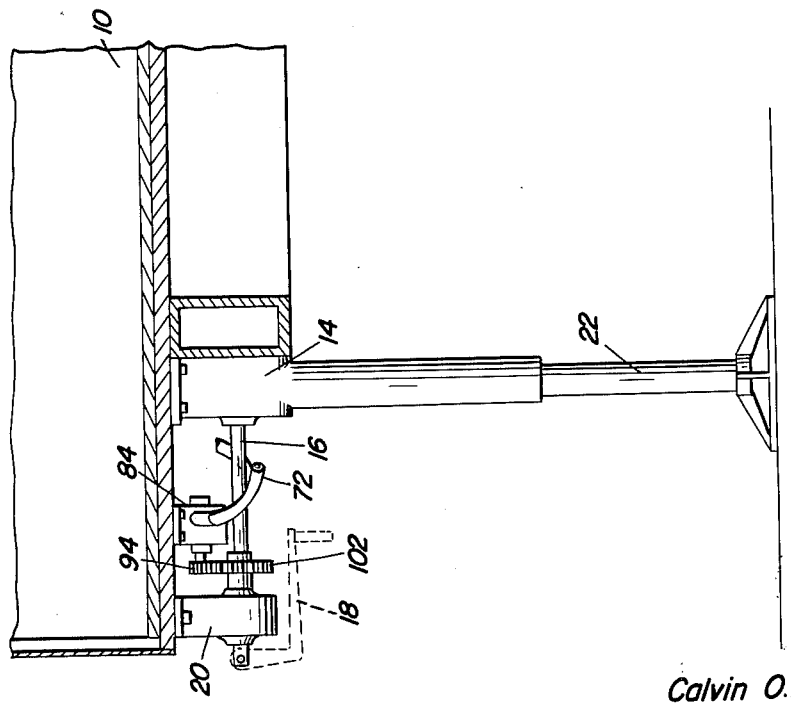
FIGURE 4 is an enlarged sectional view taken on the line 4—4 of FIGURE 1.

Referring to FIGURES 6 through 8, motor 84 is composed of an air motor case 86 having an internal cavity 88 occupied by turbine wheel 90 mounted for rotation on a spindle 92. The spindle is carried by bearings attached to the case of the motor and has a pinion 94 at the end thereof located on the exterior of the motor case. A mounting flange 96 is cast integral or otherwise secured to the case of the motor and has bolt holes 98 by which to receive bolts that secure the motor to the undercarriage of the trailer 10.

Pinion 94 is engaged with adapter gear 102. This gear is secured to shaft 16, and the motor 84 is so mounted that pinion 94 is engaged with adapter gear 102. The construction of the adapter gear is shown in FIGURE 5. It is composed of semi-cylindrical gear sections 104 and 106 together with a pair of hub sections 108 and 110. One of the hub sections has a setscrew 112, spline or the like by which to engage shaft 16. The sections 104 and 106 are connected together by bolts 116 and nuts 118 passed through aligned openings of adjacent spokes 120 and 122 of the gear sections 104 and 106. Therefore, the gear being made in two halves may be placed onto shaft 16 and bolted in place, after which setscrew 112 is tightened securely so that the shaft 16 has gear 102 mechanically fixed thereto.

In operation after installation of the kit, postulating that the pneumatic operator is not original equipment, movement of the valve to the position of FIGURE 7 permits air to flow into air motor 84 in a direction turning the turbine wheel 90 so as to cause shaft 16, through gearing 94 and 102, to rotate in one direction. This may be either to raise or to lower the landing gear. Movement of the valve to the position shown in FIGURE 8 causes air to flow into air motor 84 in the opposite direction, meanwhile exhausting through vent 53 in the casing of the valve from the opposite direction. If the position shown in FIGURE 1 is to raise the landing gear, then the position shown in FIGURE 8 will be to lower the landing gear. The positions of operation are arbitrary depending on whether clockwise or counter-clockwise rotation of shaft 16 will cause the landing gear to be raised or lowered. When the valve is adjusted to the position shown in FIGURE 3 it is evident that no air is capable of flowing through radial ports or passages 56 and 58 and therefore the air motor remains de-energized.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

An alternate power attachment for an existing semi-trailer having a crank actuated, screw jack type landing gear assembly mounted adjacent the forward end of said semi-trailer and operatively connected to an axially fixed transversely extending geared rigid drive shaft having an end adapted to receive an actuating crank, said power attachment comprising, a drive gear fixed to said drive shaft, servomotor means having a power shaft, an output gear fixed to said power shaft, a mount for fixedly securing said servomotor means to the underside of said semi-trailer in juxtaposed axially fixed relation to said crank shaft with said drive and output gears in constant mesh engagement, reversible control means adapted for connection to a source of air power and selectively operable to energize said servomotor means to drive said power shaft, said output gear, said drive gear and said screw jack type landing gear assembly selectively in opposite directions to project said landing gear assembly into support position and to retract said landing gear assembly into non-support position, said servomotor means including an air motor having an opposed pair of inlet ports and said reversible control means including a reversing fluid valve having two pressure discharge ports, and conduit connections comprising a supply line connecting said reversing valve to an air connection valve to which said source of air power is connected and a pair of connections respectively interconnecting each of said reversing valve pressure discharge ports to a respective one of said pair of fluid inlet ports, said reversing valve being located on said semi-trailer in a position accessible to an operator standing on the ground and including a manual control element adapting said reversing valve for directional control, a hanger journal secured to the underside of the semi-trailer transversely spaced from the landing gear assembly for rotatably supporting said drive shaft, said air motor being disposed between said hanger journal and the landing gear assembly and above the drive shaft to vertically space said power shaft above the drive shaft whereby said drive gear fixed to said drive shaft is disposed in accessible position below said output gear fixed to the power shaft of the air motor, said drive gear being a sectionally removable gear assembly.

References Cited in the file of this patent
UNITED STATES PATENTS

| | | |
|---|---|---|
| 430,819 | Atwood | June 24, 1890 |
| 726,517 | Deutsch | Apr. 28, 1903 |
| 1,063,089 | Walker | May 27, 1913 |
| 1,868,922 | Schwerin et al. | July 26, 1932 |
| 2,429,008 | Wolfe | Oct. 14, 1947 |
| 2,431,245 | Haig et al. | Nov. 18, 1947 |
| 2,523,962 | Mahaffey et al. | Sept. 26, 1950 |
| 2,959,395 | Strack et al. | Nov. 8, 1960 |

FOREIGN PATENTS

| | | |
|---|---|---|
| 1,095,463 | France | Dec. 22, 1954 |